United States Patent
Yang

(10) Patent No.: US 9,942,155 B2
(45) Date of Patent: Apr. 10, 2018

(54) TRAFFIC OFFLOADING METHOD, APPARATUS, AND SYSTEM

(71) Applicant: Huawei Technologies Co., Ltd., Shenzhen (CN)

(72) Inventor: Jishang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 15/172,715

(22) Filed: Jun. 3, 2016

(65) Prior Publication Data

US 2016/0285770 A1    Sep. 29, 2016

Related U.S. Application Data

(63) Continuation of application No. PCT/CN2014/085355, filed on Aug. 28, 2014.

(30) Foreign Application Priority Data

Dec. 6, 2013    (CN) .......................... 2013 1 0659400

(51) Int. Cl.
*H04L 12/28* (2006.01)
*H04L 12/803* (2013.01)
(Continued)

(52) U.S. Cl.
CPC ............ *H04L 47/125* (2013.01); *H04L 45/38* (2013.01); *H04L 45/54* (2013.01); *H04L 45/745* (2013.01); *H04L 47/2441* (2013.01); *H04L 45/64* (2013.01)

(58) Field of Classification Search
CPC ................................................... H04L 47/125
(Continued)

(56) References Cited

U.S. PATENT DOCUMENTS 8,327,014 B2 * 12/2012 Foschiano ............... H04L 45/64
  370/229
2009/0092136 A1 * 4/2009 Nazareth ............... H04L 45/745
  370/392

(Continued)

FOREIGN PATENT DOCUMENTS

CN    102209348 A    10/2011
CN    103036802 A    4/2013
(Continued)

OTHER PUBLICATIONS

"OpenFlow Switch Specification Version 1.4.0," Open Networking Foundation, Wire Protocol 0x05, Oct. 14, 2013, 206 pages.
"SPARC ICT-258457 Split Architecture for Large Scale Wide Area Networks. Deliverable D3.3," Retrieved from the Internet: URL: http://www.fp7-sparc.eu/assets/deliverables/SPARC_D3.3_Split_Architecture_for_Large_Scale_wide_Area_Networks.pdf [retrieved on Sep. 11, 2014], Dec. 2011, 130 pages.
(Continued)

*Primary Examiner* — Shripal Khajuria
(74) *Attorney, Agent, or Firm* — Conley Rose, P.C.

(57) ABSTRACT

A traffic offloading method, apparatus, and system, relates to the field of communications technologies, and resolves a problem of difficulty in implementing traffic offloading on a downstream node in a solution of the prior art. The method may include receiving, by a downstream node, flow table support capability information of an upstream node, determining, according to the flow table support capability information, whether the upstream node supports a downstream node flow table, where the downstream node flow table includes at least one flow entry, and each flow entry corresponds to one flow, and sending the downstream node flow table to the upstream node when the upstream node supports the downstream node flow table.

20 Claims, 7 Drawing Sheets

(51) Int. Cl.
*H04L 12/721* (2013.01)
*H04L 12/741* (2013.01)
*H04L 12/851* (2013.01)
*H04L 12/715* (2013.01)

(58) Field of Classification Search
USPC .......................................................... 370/392
See application file for complete search history.

(56) References Cited

U.S. PATENT DOCUMENTS

| | | | | |
|---|---|---|---|---|
| 2011/0261825 | A1* | 10/2011 | Ichino | H04L 45/38 370/400 |
| 2013/0272305 | A1* | 10/2013 | Lefebvre | H04L 47/24 370/392 |

FOREIGN PATENT DOCUMENTS

| | | |
|---|---|---|
| EP | 2819356 A1 | 12/2014 |
| WO | 2013125342 A1 | 8/2013 |

OTHER PUBLICATIONS

Rizzo, L., et al., "Change: Enabling Innovation in the Internet Architecture through Flexible Flow-Processing Extensions, D3.2: Flow Processing Platform Design and Early Implementation" Retrieved from the Internet: URL: http://typo3.change-project.eu/fileadmin/publications/Deliverables/CHANGE_Deliverable_D3-2_Revised.pdf [retrieved on Nov. 24, 2014], Sep. 28, 2012, 110 pages.
Foreign Communication Form A Counterpart Application, European Application No. 14867575.4, Extended European Search Report dated Oct. 12, 2016, 8 pages.
Foreign Communication From a Counterpart Application, PCT Application No. PCT/CN2014/085355, English Translation of International Search Report dated Dec. 5, 2014, 2 pages.
Foreign Communication From a Counterpart Application, PCT Application No. PCT/CN2014/085355, English Translation of Written Opinion dated Dec. 5, 2014, 6 pages.

* cited by examiner

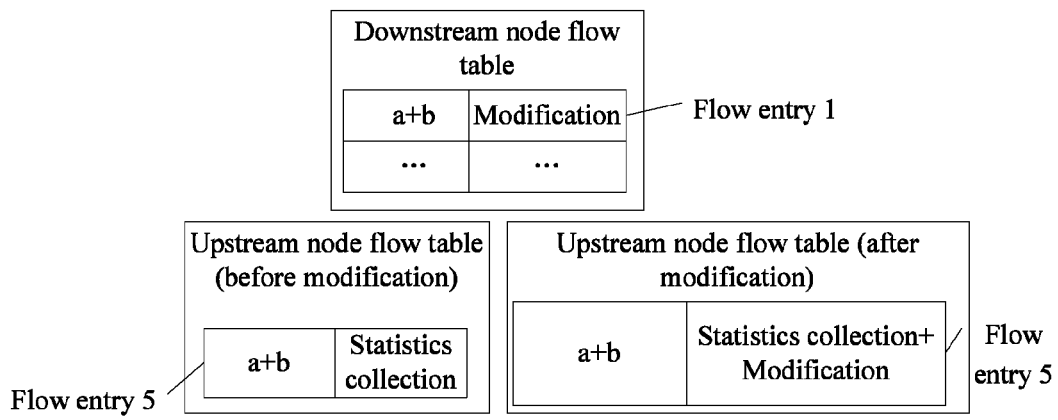
FIG. 4
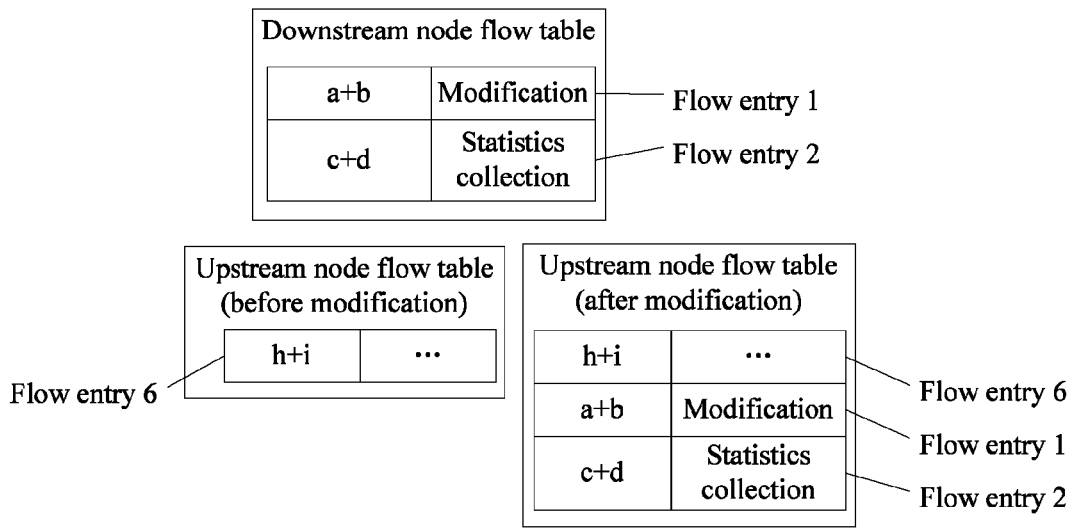
FIG. 5
FIG. 6

TRAFFIC OFFLOADING METHOD, APPARATUS, AND SYSTEM

CROSS-REFERENCE TO RELATED APPLICATIONS

This application is a continuation of International Application No. PCT/CN2014/085355, filed on Aug. 28, 2014, which claims priority to Chinese Patent Application No. 201310659400.9, filed on Dec. 6, 2013, both of which are hereby incorporated by reference in their entireties.

TECHNICAL FIELD

The present disclosure relates to the field of communications technologies, and in particular, to a traffic offloading method, apparatus, and system.

BACKGROUND

In a service chain scenario, after a service path is specified for some traffic, the traffic passes through a flow distribution node and each service node according to the service path and a specified sequence. However, when packet processing is performed between adjacent nodes of the flow distribution node and service nodes, flow rules between the adjacent nodes may be the same, or an upstream node can support a flow rule of its downstream node, and packet processing performed by the downstream node such as discarding, allowing passing, and forwarding, can also be performed by the upstream node. In many cases, and especially in a case in which flow processing by the upstream node is implemented using hardware, how many actions are performed on a flow is irrelevant to traffic processing performance of the upstream node, which is flow processing performance in brief, or how many actions are performed does not have great impact on flow processing performance. That is, no matter how many actions are performed on the flow by the upstream node, the flow processing performance of the upstream node does not change greatly, for example, flow processing implemented using an application-specific integrated circuit (ASIC). In the foregoing cases, if flow processing performed by the downstream node is deployed in its upstream node, burden of the downstream node can be reduced, and there is no great impact on the flow processing performance of the upstream node. In the foregoing content, the upstream node and the downstream node are two adjacent nodes.

Generally, flow processing by the downstream node may be deployed in its upstream node by performing traffic offloading on the downstream node.

However, in the prior art, no specific solution to traffic offloading on the downstream node is provided. Therefore, it is very difficult to perform traffic offloading on the downstream node.

SUMMARY

The present disclosure provides a traffic offloading method, apparatus, and system to resolve a problem of difficulty in implementing traffic offloading on a downstream node in a solution of the prior art.

To achieve the foregoing objective, the present disclosure adopts the following technical solutions:

According to a first aspect, the present disclosure provides a traffic offloading method, including receiving, by a downstream node, flow table support capability information of an upstream node, determining, according to the flow table support capability information, whether the upstream node supports a downstream node flow table, where the downstream node flow table includes at least one flow entry, and each flow entry corresponds to one flow, and sending the downstream node flow table to the upstream node if the upstream node supports the downstream node flow table.

According to a second aspect, the present disclosure provides another traffic offloading method, including sending, by an upstream node, flow table support capability information of the upstream node to a downstream node, receiving a downstream node flow table sent by the downstream node, where the downstream node flow table includes at least one flow entry, and each flow entry corresponds to one flow, modifying an upstream node flow table according to the downstream node flow table, where the modified upstream node flow table includes the downstream node flow table, and sending a first packet generated after flow processing is performed according to the modified upstream node flow table to a next downstream node, where the first packet is a packet of a flow corresponding to a flow entry in the downstream node flow table.

According to a third aspect, the present disclosure provides a traffic offloading apparatus, including a first receiving unit configured to receive flow table support capability information of an upstream node, a first determining unit configured to determine, according to the flow table support capability information, whether the upstream node supports a downstream node flow table, where the downstream node flow table includes at least one flow entry, and each flow entry corresponds to one flow, and a sending unit configured to send the downstream node flow table to the upstream node if the upstream node supports the downstream node flow table.

According to a fourth aspect, the present disclosure provides another traffic offloading apparatus, including a first sending unit configured to send flow table support capability information of an upstream node to a downstream node, a receiving unit configured to receive a downstream node flow table sent by the downstream node, where the downstream node flow table includes at least one flow entry, and each flow entry corresponds to one flow, a modifying unit configured to modify an upstream node flow table according to the downstream node flow table, where the modified upstream node flow table includes the downstream node flow table, and a second sending unit configured to send a first packet generated after flow processing is performed according to the modified upstream node flow table to a next downstream node, where the first packet is a packet of a flow corresponding to a flow entry in the downstream node flow table.

According to a fifth aspect, the present disclosure provides a traffic offloading system, including an upstream node configured to send flow table support capability information of the upstream node to a downstream node, receive the downstream node flow table sent by the downstream node after the downstream node determines, according to the flow table support capability information, that the upstream node supports a downstream node flow table, where the downstream node flow table includes at least one flow entry, and each flow entry corresponds to one flow, modify an upstream node flow table according to the downstream node flow table, where the modified upstream node flow table includes the downstream node flow table, and send a first packet generated after flow processing is performed according to the modified upstream node flow table to a next downstream node, where the first packet is a packet of a flow corresponding to a flow entry in the downstream node flow table. The downstream node is configured to receive the flow table support capability information, determine, according to the flow table support capability information, whether the upstream node supports the downstream node flow table, and send the downstream node flow table to the upstream node if the upstream node supports the downstream node flow table, and the next downstream node is configured to receive the first packet sent by the upstream node.

In the traffic offloading method, apparatus, and system provided by the present disclosure, a downstream node receives flow table support capability information of an upstream node, determines, according to the flow table support capability information, whether the upstream node supports a downstream node flow table, where the downstream node flow table includes at least one flow entry, and each flow entry corresponds to one flow, and sends the downstream node flow table to the upstream node such that the upstream node modifies an upstream node flow table according to the downstream node flow table if the upstream node supports the downstream node flow table, where the modified upstream node flow table includes the downstream node flow table. After the upstream node flow table is modified, the upstream node sends a first packet generated after flow processing is performed according to the modified upstream node flow table to a next downstream node, where the first packet is a packet of a flow corresponding to a flow entry in the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

BRIEF DESCRIPTION OF DRAWINGS

To describe the technical solutions in the embodiments of the present disclosure more clearly, the following briefly introduces the accompanying drawings required for describing the embodiments.

FIG. 4 is a schematic diagram of a structure of a downstream node flow table in the method shown in FIG. 3 according to an embodiment of the present disclosure;

FIG. 5 is a schematic diagram of a structure of a downstream node flow table and a schematic diagram of a structure of an upstream node flow table before and after modification in the method shown in FIG. 3 according to an embodiment of the present disclosure;

FIG. 6 is a schematic diagram of a structure of another upstream node flow table before and after modification when a downstream node flow table is the flow table shown in FIG. 4 in the method shown in FIG. 3 according to an embodiment of the present disclosure;

DESCRIPTION OF EMBODIMENTS

The following clearly describes the technical solutions in the embodiments of the present disclosure with reference to the accompanying drawings in the embodiments of the present disclosure.

Figure 1:
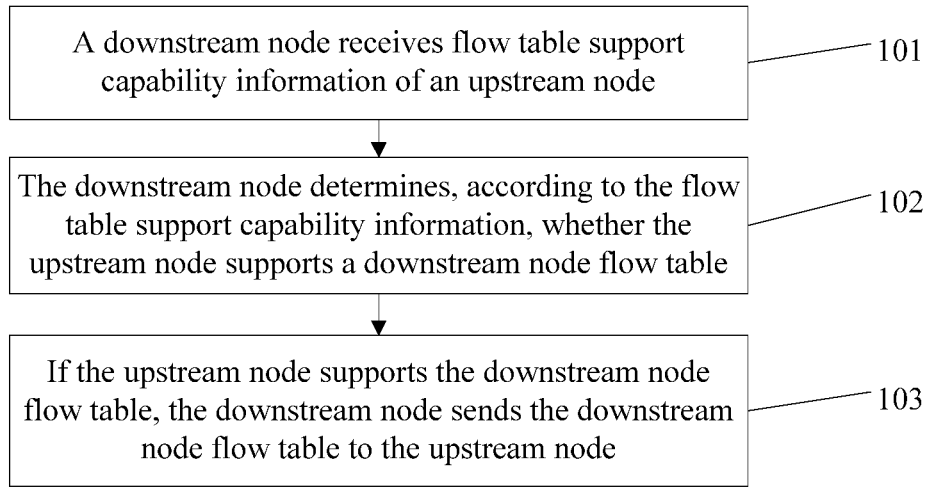
FIG. 1 is a flowchart of a traffic offloading method according to an embodiment of the present disclosure.

To resolve the foregoing problem, an embodiment provides a traffic offloading method, and as shown in FIG. 1, the method may include the following steps.

Step 101: A downstream node receives flow table support capability information of an upstream node.

The downstream node may include at least one flow table, where each flow table may include at least one flow entry, and each flow entry corresponds to one flow. Values of flow classification fields in different flow entries in a same flow table are different, and flow classification fields in flow entries in different flow tables are different. For example, the downstream node may include a flow table 1 and a flow table 2, where the flow table 1 may include a flow entry a and a flow entry b, and the flow table 2 may include a flow entry c and a flow entry d. Flow classification fields in the flow entry a and the flow entry b are the same, for example, may both be a source address and a destination media access control (MAC) address, but values of the flow classification fields are different. Flow classification fields in the flow entry c and the flow entry d are the same, but values of the flow classification fields are different. The flow classification fields in the flow entry a and the flow entry c may be different, the flow classification fields in the flow entry b and the flow entry c may be different, the flow classification fields in the flow entry b and the flow entry d may be different, and the flow classification fields in the flow entry a and the flow entry d may be different. In addition, the flow entry a and the flow entry b in the flow table 1 correspond to different flows.

Each node may perform corresponding flow processing on a packet in a received flow according to a flow table of the node. The processing may include the following. The node receives a packet and determines a flow to which the packet belongs, searches the flow table for a flow entry whose flow classification field is the same as that of the determined flow, and determines an action according to the found flow entry if the flow entry whose flow classification field is the same as that of the determined flow is found in the flow table, and performs an action corresponding to the action on the received packet, that is, performs flow processing, or if the flow entry whose flow classification field is the same as that of the determined flow is not found in the flow table, creates a new flow table and then determines an action.

The flow table support capability information provided by this embodiment may be used, without limitation, to represent flow classification fields and actions supported by the upstream node, that is, flow classification fields according to which the upstream node may generate corresponding flow entries, actions that may be performed by the upstream node, and the like.

The flow table support capability information provided by this embodiment may be used to represent a flow table according to which the upstream node can perform corresponding flow processing.

Step 102: The downstream node determines, according to the flow table support capability information, whether the upstream node supports a downstream node flow table.

That the downstream node determines, according to the flow table support capability information, whether the upstream node supports a downstream node flow table, may include that the downstream node may determine, according to the flow table support capability information, whether the downstream node flow table is a flow table supported by the upstream node, that is, the downstream node determines whether the upstream node can generate a corresponding flow entry according to a flow classification field in the downstream node flow table, and determines whether the upstream node can perform an action in the downstream node flow table.

Step 103: If the upstream node supports the downstream node flow table, the downstream node sends the downstream node flow table to the upstream node.

The downstream node flow table is used by the upstream node to modify an upstream node flow table according to the downstream node flow table and send, after the upstream node flow table is modified, a first packet generated after flow processing is performed according to the modified upstream node flow table to a next downstream node.

The modified upstream node flow table may include but is not limited to the downstream node flow table, and the first packet is a packet of a flow corresponding to a flow entry in the downstream node flow table.

When the modified upstream node flow table includes the downstream node flow table, flow processing that should be performed by the downstream node according to the downstream node flow table may be performed by the upstream node according to the modified upstream node flow table. In this way, packets of flows may be no longer sent to the downstream node for flow processing. In addition, packets generated after flow processing is performed by the upstream node may be directly sent by the upstream node to the next downstream node for corresponding flow processing. The next downstream node is a downstream node of the downstream node.

In this embodiment, a downstream node receives flow table support capability information of an upstream node, determines, according to the flow table support capability information, whether the upstream node supports a downstream node flow table, where the downstream node flow table includes at least one flow entry, and each flow entry corresponds to one flow, and if the upstream node supports the downstream node flow table, sends the downstream node flow table to the upstream node such that the upstream node modifies an upstream node flow table according to the downstream node flow table, where the modified upstream node flow table includes the downstream node flow table. After the upstream node flow table is modified, the upstream node sends a first packet generated after flow processing is performed according to the modified upstream node flow table to a next downstream node, where the first packet is a packet of a flow corresponding to a flow entry in the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

Figure 2:
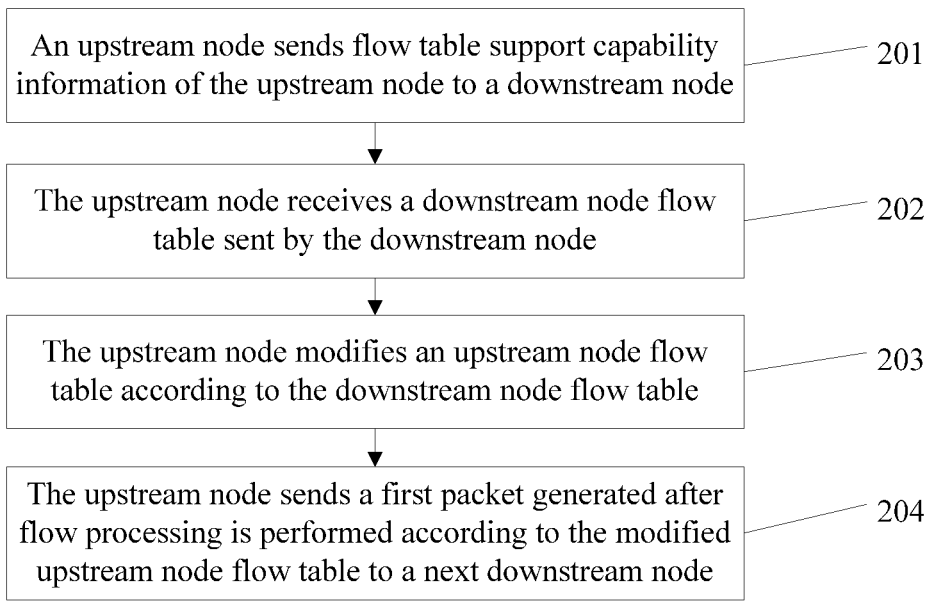
FIG. 2 is a flowchart of another traffic offloading method according to an embodiment of the present disclosure.

An embodiment provides another traffic offloading method, where the method is a method performed by a communication peer in the method shown in FIG. 1. As shown in FIG. 2, the method may include the following steps.

Step 201: An upstream node sends flow table support capability information of the upstream node to a downstream node.

Step 202: The upstream node receives a downstream node flow table sent by the downstream node.

The downstream node flow table may include at least one flow entry, and each flow entry corresponds to one flow.

Step 203: The upstream node modifies an upstream node flow table according to the downstream node flow table.

The modified upstream node flow table may include but is not limited to the downstream node flow table.

Modifying an upstream node flow table according to the downstream node flow table may include performing, by the upstream node, operations such as combining flow entries and creating a flow entry according to the received downstream node flow table.

Step 204: The upstream node sends a first packet generated after flow processing is performed according to the modified upstream node flow table to a next downstream node.

The first packet is a packet of a flow corresponding to a flow entry in the downstream node flow table.

In this embodiment, an upstream node sends flow table support capability information of the upstream node to a downstream node. The upstream node receives the downstream node flow table sent by the downstream node after the downstream node determines, according to the flow table support capability information, that the upstream node supports a downstream node flow table, where the downstream node flow table includes at least one flow entry, and each flow entry corresponds to one flow. The upstream node modifies an upstream node flow table according to the downstream node flow table, where the modified upstream node flow table includes the downstream node flow table, and the upstream node sends a first packet generated after flow processing is performed according to the modified upstream node flow table to a next downstream node, where the first packet is a packet of a flow corresponding to a flow entry in the downstream node flow table. After foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

Figure 3:
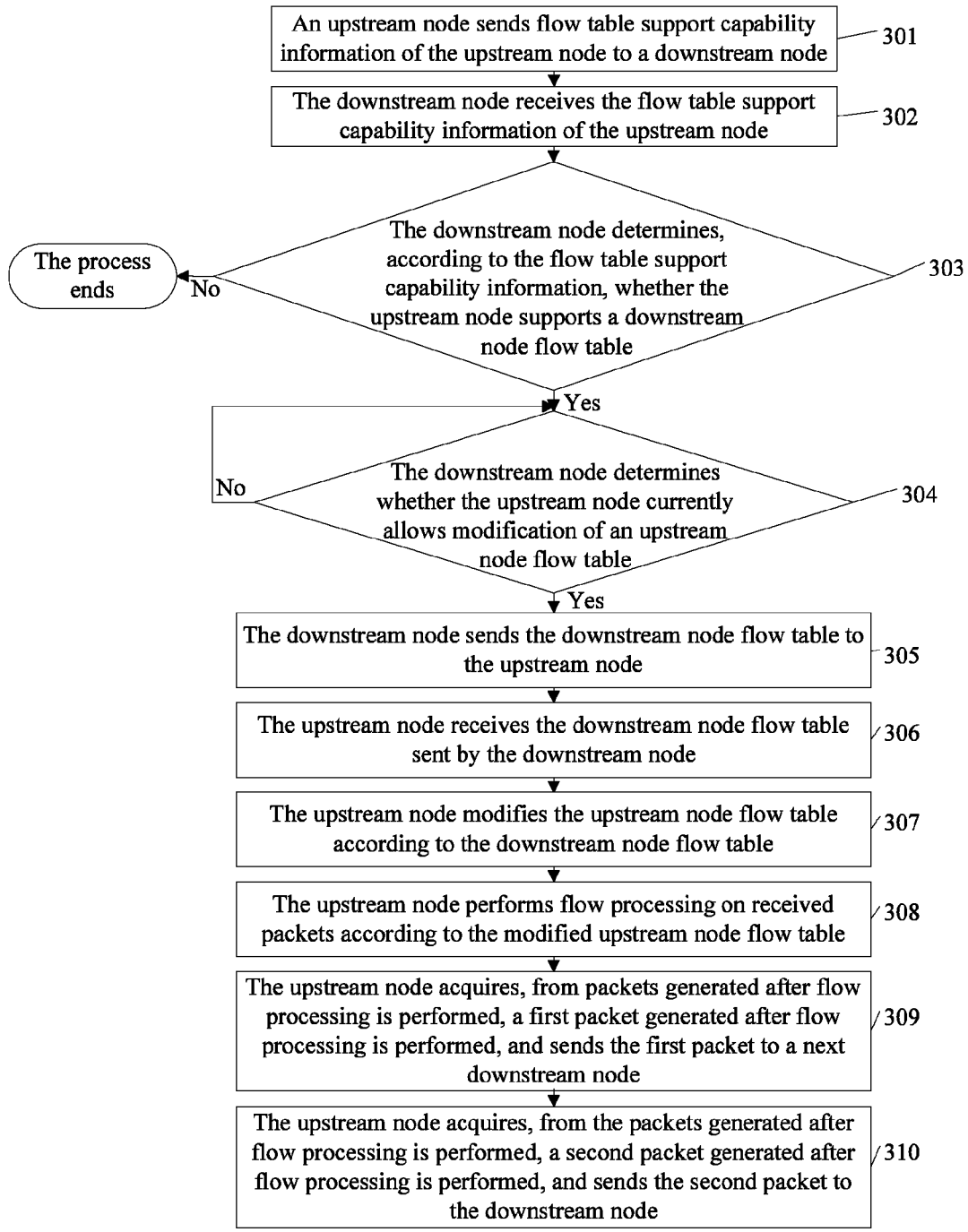
FIG. 3 is a flowchart of still another traffic offloading method according to an embodiment of the present disclosure.

An embodiment provides another traffic offloading method, where the method is a further extension and optimization of the methods shown in FIG. 1 and FIG. 2. As shown in FIG. 3, the method may include the following steps.

Step 301: An upstream node sends flow table support capability information of the upstream node to a downstream node.

A management device may receive a service processing requirement sent by a user, which may include, for example, a type of a service that needs to be executed on a corresponding flow and an execution sequence thereof, performance specifications of flow processing that is performed when various services are executed, and the like. The management device may determine, according to the foregoing requirement, service processing nodes for performing the service, and may further generate a service path according to the foregoing requirement and the determined service processing nodes. The management device may send the service path to each service processing node such that each service processing node determines an upstream node, a downstream node, a next downstream node, and the like of the service processing node in the service path. If a service processing node is the first node in the service path, only a downstream node and a next downstream node of the service processing node in the service path may be determined. If a service processing node is the second last node in the service path, only an upstream node and a downstream node of the service processing node in the service path may be determined. If a service processing node is the last node in the service path, only an upstream node of the service processing node in the service path may be determined.

In this embodiment, each of the determined service processing nodes may be an upstream node, or may be a downstream node, or may be a next downstream node. All the upstream node, downstream node, and next downstream node are relative nodes, and none of them refers to a definite node.

Further, that an upstream node sends flow table support capability information of the upstream node to a downstream node may include but is not limited to sending, by the upstream node, the flow table support capability information to the downstream node directly.

Sending, by the upstream node, the flow table support capability information to the downstream node directly may include but is not limited to sending, by the upstream node using a mechanism in which a network device in OPENFLOW notifies a flow table support capability of the network device to an OPENFLOW controller, the flow table support capability information to the downstream node directly.

Alternatively, that an upstream node sends flow table support capability information of the upstream node to a downstream node may include but is not limited to sending, by the upstream node, the flow table support capability information to the downstream node through a management device.

Sending, by the upstream node, the flow table support capability information to the downstream node through a management device may include but is not limited to sending, by the upstream node using a mechanism in which a network device in OPENFLOW notifies a flow table support capability of the network device to an OPENFLOW controller, the flow table support capability information to the service chain management system such that the service chain management system sends the flow table support capability information to the downstream node.

This embodiment does not limit the method for sending the flow table support capability information of the upstream node by the upstream node to the downstream node. The method may be set according to an actual requirement, and is not further described herein.

Step 302: The downstream node receives the flow table support capability information of the upstream node.

Further, that the downstream node receives the flow table support capability information of the upstream node may include but is not limited to receiving, by the downstream node, the flow table support capability information directly sent by the upstream node, or may be receiving, by the downstream node, the flow table support capability information sent by the upstream node through the management device.

Furthermore, receiving, by the downstream node, the flow table support capability information sent by the upstream node includes receiving, by the downstream node, the flow table support capability information that is sent by the upstream node using a mechanism in which a network device in a OPENFLOW notifies a flow table support capability of the network device to an OPENFLOW controller.

Furthermore, receiving, by the downstream node, the flow table support capability information sent by the upstream node through the management device includes receiving, by the downstream node, the flow table support capability information sent by the service chain management system, where the flow table support capability information is sent by the upstream node to the service chain management system using a mechanism in which a network device in OPENFLOW notifies a flow table support capability of the network device to an OPENFLOW controller.

This embodiment does not limit the method for receiving the flow table support capability information of the upstream node by the downstream node. The method may be set according to an actual requirement, and is not further described herein.

Step 303: The downstream node determines, according to the flow table support capability information, whether the upstream node supports a downstream node flow table. If the upstream node supports the downstream node flow table, step 304 is performed. If the upstream node does not support the downstream node flow table, the process ends.

The downstream node flow table may include at least one flow entry, and each flow entry corresponds to one flow.

First, a method for generating a flow table by each service processing node, which may include an upstream node, a downstream node, and a next downstream node, is described briefly, and an example in which a service processing node executes the method is used for description.

A service processing node receives an initial packet of a flow, and performs corresponding flow processing on the initial packet, that is, performs a corresponding action, which may be, for example, a modification action. Then, the service processing node generates a flow entry according to a local flow classification rule and the performed action, where the flow classification rule may be executed based on a corresponding flow classification field, and the flow entry may include a correspondence between a flow classification field and the action.

For example, the flow classification field may include but is not limited to a source MAC address and/or a destination MAC address, where a value of the source MAC address of the flow is a, and a value of the destination MAC address is b. Therefore, the generated flow entry corresponding to the flow may include a correspondence between a+b and the modification action. Afterward, when receiving a packet in the flow again, the service processing node may first search the flow table according to the flow classification field, namely, the source MAC address and/or the destination MAC address, and the value of the flow classification field, namely, the value of the source MAC address and the value of the destination MAC address, for the flow entry corresponding to the flow, then acquire the action from the flow entry, and perform a modification operation on the received packet according to the acquired action.

This embodiment does not limit the method for generating a flow table by the service processing node. The method is a technique well known to a person skilled in the art, and is not further described herein.

Furthermore, determining, according to the flow table support capability information, whether the upstream node supports a downstream node flow table, may include but is not limited to determining, according to the flow table support capability information, whether the upstream node supports generation of a flow entry according to the flow classification field, and determining, according to the flow table support capability information, whether the upstream node supports the action.

For example, one of flow tables of the downstream node includes a flow entry 1 and a flow entry 2. A flow classification field in the flow entry 1 is a source MAC address and a destination MAC address whose values are a and b respectively, that is, the value of the source MAC address is a, and the value of the destination MAC address is b (similar description is omitted in a subsequent step), and an action is used to represent a modification operation to be performed. A flow classification field in the flow entry 2 is a source MAC address and a destination MAC address whose values are c and d respectively, and an action is used to represent a statistics collection operation to be performed. In this case, the downstream node may determine, according to the support capability information of the upstream node, whether the upstream node supports generation of a flow entry according to the source MAC address and the destination MAC address, and further needs to determine whether the upstream node can perform the modification operation, statistics collection operation, and the like. If all the foregoing determining results are yes, it may indicate that the upstream node supports the downstream node flow table, that is, all flow processing performed by the downstream node may be implemented by the upstream node.

This embodiment does not limit the method for determining, by the downstream node according to the flow table support capability information, whether the upstream node supports the downstream node flow table. The method is not limited to the foregoing illustrated example, and may be set according to an actual requirement, which is not further described herein.

Step 304: The downstream node determines whether the upstream node currently allows modification of an upstream node flow table. If the upstream node currently allows modification of the upstream node flow table, step 305 is performed. If the upstream node currently does not allow modification of the upstream node flow table, step 304 is performed.

Further, that the downstream node determines whether modification of an upstream node flow table is currently allowed may include but is not limited to determining, by the upstream node, whether a vacant position currently exists in the upstream node flow table, if no vacant position currently exists in the upstream node flow table, sending a pause notification to the downstream node such that the downstream node may determine, according to the pause notification, that the upstream node currently does not allow modification of the upstream node flow table, and pause sending of the downstream node flow table to the upstream node, and when the upstream node detects that a vacant position currently exists in the upstream node flow table, sending a resumption notification to the downstream node such that the downstream node may determine, according to the resumption notification, that the upstream node currently allows modification of the upstream node flow table, and may send the downstream node flow table to the upstream node such that the upstream node may receive the downstream node flow table, where when a flow entry in the upstream node flow table is unused within a preset time, the flow entry is automatically deleted, and after deletion is performed, more vacant positions may exist in the upstream node flow entry, or determining, by the upstream node, whether the upstream node is currently allowed to perform traffic offloading on the downstream node, sending a pause notification to the downstream node such that the downstream node may determine, according to the pause notification, that the upstream node currently does not allow modification of the upstream node flow table if the upstream node is currently not allowed to perform traffic offloading on the downstream node, and pause sending of the downstream node flow table to the upstream node, and sending a resumption notification to the downstream node such that the downstream node may determine, according to the resumption notification, that the upstream node currently allows modification of the upstream node flow table when the upstream node is allowed to perform traffic offloading on the downstream node, and may send the downstream node flow table to the upstream node such that the upstream node may receive the downstream node flow table.

This embodiment does not limit the method for determining, by the upstream node and the downstream node, whether modification of the upstream node flow table is currently allowed. The method may be set according to an actual requirement, and is not further described herein.

Step 305: The downstream node sends the downstream node flow table to the upstream node.

Step 306: The upstream node receives the downstream node flow table sent by the downstream node.

Step 307: The upstream node modifies the upstream node flow table according to the downstream node flow table.

The modified upstream node flow table may include but is not limited to the downstream node flow table.

Further, the flow entry may include but is not limited to a correspondence between a flow classification field and an action.

Furthermore, modifying the upstream node flow table according to the downstream node flow table includes determining whether the upstream node flow table includes a specified flow entry, where the specified flow entry is a flow entry whose flow classification field is the same as the flow classification field in the flow entry in the downstream node flow table, that is, the flow classification field in the specified flow entry is the same as the flow classification field in the flow entry in the downstream node flow table, and a value of the flow classification field in the specified flow entry is the same as a value of the flow classification field in the flow entry in the downstream node flow table, and adding the action in the flow entry that has the same flow classification field as the specified flow entry and is in the downstream node flow table, to the corresponding specified flow entry if the upstream node flow table includes the specified flow entry, or determining whether the upstream node flow table includes a specified flow entry, where the specified flow entry is a flow entry whose flow classification field is the same as the flow classification field in the flow entry in the downstream node flow table, and creating a new flow entry in the upstream node flow table according to the downstream node flow table if the upstream node flow table does not include the specified flow entry.

For example, as shown in FIG. 4, the downstream node flow table includes a flow entry 1 and a flow entry 2. A flow classification field in the flow entry 1 is a source MAC address and a destination MAC address whose values are a and b respectively, and an action is used to represent a modification operation to be performed. A flow classification field in the flow entry 2 is a source MAC address and a destination MAC address whose values are c and d respectively, and an action is used to represent a statistics collection operation to be performed. In this case, the upstream node determines whether the upstream node flow table includes a specified flow entry whose flow classification field is the source MAC address and the destination MAC address and values of the source MAC address and the destination MAC address are a and b respectively, and further determines whether the flow entries in the upstream node flow table include a specified flow entry whose flow classification field is the source MAC address and the destination MAC address and values of the source MAC address and the destination MAC address are c and d respectively.

If the upstream node flow table includes the specified flow entry, for example, if the upstream node flow table includes a flow entry 5, a flow classification field in the flow entry 5 is a source MAC address and a destination MAC address, and values of the source MAC address and the destination MAC address are a and b respectively, it may be further determined whether actions in the flow entry 1 and flow entry 5 are the same, if the actions are not the same, the action in the flow entry 1 is added to the flow entry 5. For example, as shown in FIG. 5, if the flow entry 5 before modification may include a correspondence between (a+b) and the statistics collection operation, the flow entry 5 after modification may include a correspondence between (a+b) and (statistics collection operation+modification operation).

As shown in FIG. 6, if the upstream node flow table does not include the specified flow entry, the downstream node flow entry may be added to the upstream node flow table. For example, the upstream node flow table includes only a flow entry 6, and a flow classification field in the flow entry 6 is a source MAC address and a destination MAC address whose values are h and i respectively. As may be known from that, the flow classification field in the flow entry 6 is different from the flow classification fields in the flow entry 1 and flow entry 2. Furthermore, the flow classification field in the flow entry 6 is same as the flow classification fields in the flow entry 1 and flow entry 2, but values of the flow classification fields are different, that is, values of the source MAC address and the destination MAC address in the flow entry 6 are different from values of the source MAC address and the destination MAC address in the flow entry 1 and the flow entry 2. Therefore, the flow entry 1 and the flow entry 2 may be added to the upstream node flow table. In this case, the upstream node flow table may include the flow entry 6, the flow entry 1, and the flow entry 2.

Figure 7:
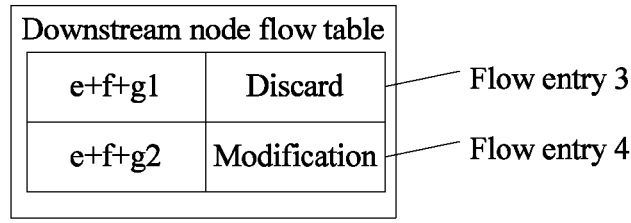
FIG. 7 is a schematic diagram of a structure of another downstream node flow table in the method shown in FIG. 3 according to an embodiment of the present disclosure.

For another example, as shown in FIG. 7, the downstream node flow table may include a flow entry 3 and a flow entry 4. Flow classification fields in the flow entry 3 and the flow entry 4 are source MAC addresses, destination MAC addresses, and port numbers, where values in the two flow entries are e, f, and g1, and e, f, and g2 respectively, and actions are respectively used to represent respectively a discard operation and a modification operation to be performed.

Figure 8:
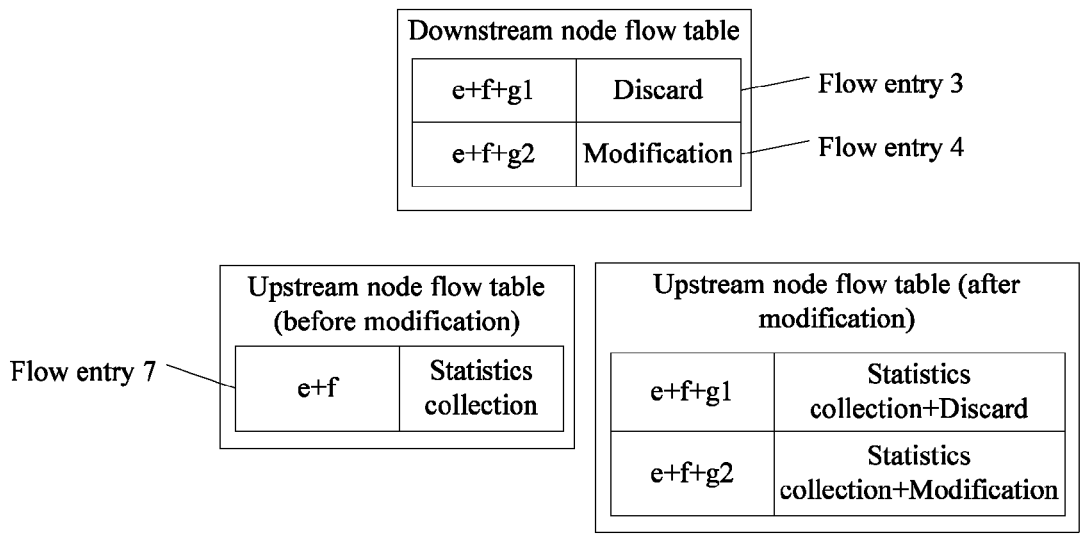
FIG. 8 is a schematic diagram of a structure of an upstream node flow table before and after modification when a downstream node flow table is the flow table shown in FIG. 7 in the method shown in FIG. 3 according to an embodiment of the present disclosure.

If the upstream node flow table does not include the specified flow entry in this case, for example, as shown in FIG. 8, if the upstream node flow table includes only a flow entry 7, where a flow classification field in the flow entry 7 is a source MAC address and a destination MAC address whose values are e and f respectively, and an action is used to represent a statistics collection operation to be performed, then two new flow entries may be created in the upstream node flow table, that is, may include a correspondence between (e+f+g1) and (statistics collection operation+discard operation) and a correspondence between (e+f+g2) and (statistics collection operation+modification operation) respectively.

Step 308: The upstream node performs flow processing on received packets according to the modified upstream node flow table.

After receiving a packet, the upstream node searches the upstream node flow table for a flow entry corresponding to the packet, and then performs a corresponding action on the received packet according to an action in the flow entry.

Furthermore, if a flow classification field in the upstream node flow table is a source MAC address and a destination MAC address, values of a source MAC address and a destination MAC address in the received packet are a and b respectively, a flow entry found in the upstream node flow table may include but is not limited to a correspondence between (a+b) and a statistics collection operation, and it indicates that the packet is a packet in a flow in which a value of a source MAC address is a and a value of a destination MAC address is b, then the upstream node may perform the statistics collection operation on the packet. If a flow classification field in the upstream node flow table is a source MAC address, a destination MAC address, and a port number, values of a source MAC address, a destination MAC address, and a port number in the received packet are a, b, and g1 respectively, a flow entry found in the upstream node flow table may include but is not limited to a correspondence between (e+f+g1) and (statistics collection operation+discard operation), and it indicates that the packet is a packet in a flow in which a value of a source MAC address is e and values of a destination MAC address is f, and a port number are g1, then not only the statistics collection operation but also the discard operation need to be performed on the packet.

Step 309: The upstream node acquires, from packets generated after flow processing is performed, a first packet generated after the flow processing is performed, and sends the first packet to a next downstream node.

The modified upstream flow table includes the downstream node flow table, that is, flow processing performed by the downstream node on the packets of the corresponding flow according to the downstream node flow table can be deployed in the upstream node, that is, traffic offloading is implemented on a part of traffic of the downstream node, and then the upstream node may obtain the first packet, where the first packet is a packet of a flow corresponding to a flow entry in the downstream node flow table, and the first packet is a packet generated after flow processing is performed by the upstream node. Therefore, the upstream node does not need to send the first packet to the downstream node again, and may send the first packet to the next downstream node directly.

Step 310: The upstream node acquires, from the packets generated after flow processing is performed, a second packet generated after flow processing is performed, and sends the second packet to the downstream node.

The second packet is a packet generated after flow processing is performed according to the modified upstream node flow table, and is not a packet of a flow corresponding to a flow entry in the downstream node flow table.

After receiving the second packet, the downstream node may create, according to the second packet, a flow entry of a flow to which the second packet belongs, that is, the second packet may be an initial packet of the flow to which the second packet belongs. In addition, the downstream node may further send the second packet generated after flow processing is performed to the next downstream node such that the next downstream node performs corresponding flow processing on the second packet according to a next downstream node flow table.

Further, the upstream node and the downstream node may be different service processing nodes. Therefore, using this embodiment, traffic offloading between service processing nodes may be implemented.

In addition, the upstream node may also be a flow distribution node, and the downstream node may be a service processing node. Therefore, using this embodiment, traffic offloading between the service processing node and flow distribution nodes may be implemented.

In this embodiment, a downstream node receives flow table support capability information of an upstream node, determines, according to the flow table support capability information, whether the upstream node supports a downstream node flow table, where the downstream node flow table includes at least one flow entry, and each flow entry corresponds to one flow, and if the upstream node supports the downstream node flow table, sends the downstream node flow table to the upstream node such that the upstream node modifies an upstream node flow table according to the downstream node flow table, where the modified upstream node flow table includes the downstream node flow table. After the upstream node flow table is modified, the upstream node sends a first packet generated after flow processing is performed according to the modified upstream node flow table to a next downstream node, where the first packet is a packet of a flow corresponding to a flow entry in the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes, which further lowers performance specification requirements on the downstream node.

In addition, the upstream node may be a flow distribution node and a service processing node, and the downstream node may be a service processing node. Therefore, implementation of traffic offloading is not limited only to the flow distribution node and the service processing node, and is further extended to adjacent service nodes.

The following provides some apparatus embodiments. The apparatus embodiments may correspond to the corresponding method embodiments provided above.

Figure 9:
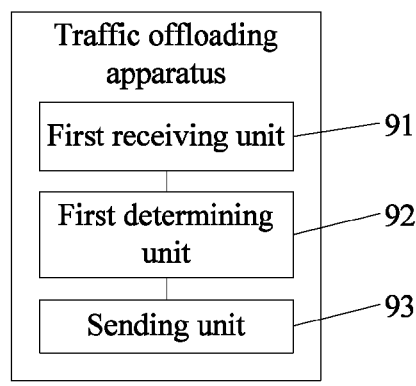
FIG. 9 is a schematic diagram of a structure of a traffic offloading apparatus according to an embodiment of the present disclosure.

An embodiment provides a traffic offloading apparatus, as shown in FIG. 9, where the apparatus may include a first receiving unit 91 configured to receive flow table support capability information of an upstream node, a first determining unit 92 configured to determine, according to the flow table support capability information, whether the upstream node supports a downstream node flow table, where the downstream node flow table includes at least one flow entry, and each flow entry corresponds to one flow, and a sending unit 93 configured to send the downstream node flow table to the upstream node if the upstream node supports the downstream node flow table.

In this embodiment, a first receiving unit is configured to receive flow table support capability information of an upstream node, a first determining unit is configured to determine, according to the flow table support capability information, whether the upstream node supports a downstream node flow table, where the downstream node flow table includes at least one flow entry, and each flow entry corresponds to one flow, and a sending unit is configured to send the downstream node flow table to the upstream node if the upstream node supports the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

Figure 10:
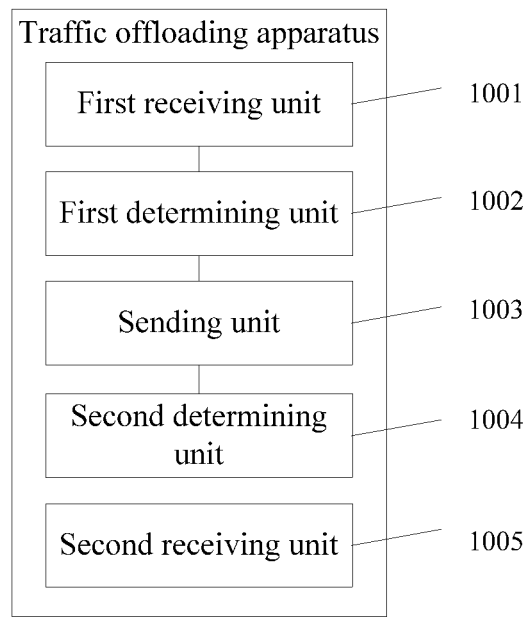
FIG. 10 is a schematic diagram of a structure of another traffic offloading apparatus according to an embodiment of the present disclosure.

An embodiment provides another traffic offloading apparatus, where the apparatus is a further extension and optimization of the apparatus shown in FIG. 9. As shown in FIG. 10, the apparatus may include a first receiving unit 1001 configured to receive flow table support capability information of an upstream node, a first determining unit 1002 configured to determine, according to the flow table support capability information, whether the upstream node supports a downstream node flow table, where the downstream node flow table includes at least one flow entry, and each flow entry corresponds to one flow, and a sending unit 1003 configured to send the downstream node flow table to the upstream node if the upstream node supports the downstream node flow table.

The first receiving unit 1001 is further configured to receive the flow table support capability information that is directly sent by the upstream node, or receive the flow table support capability information that is sent by the upstream node through a management device.

Further, the flow entry includes a correspondence between a flow classification field and an action, and the first determining unit 1002 is further configured to determine, according to the flow table support capability information, whether the upstream node supports generation of a flow entry according to the flow classification field, and determine, according to the flow table support capability information, whether the upstream node supports the action.

The traffic offloading apparatus further includes a second determining unit 1004 configured to determine, before the downstream node flow table is sent to the upstream node, whether the upstream node currently allows modification of an upstream node flow table, where the sending unit 1003 is further configured to send the downstream node flow table to the upstream node if the upstream node currently allows modification of the upstream node flow table.

The traffic offloading apparatus further includes a second receiving unit 1005 configured to receive a packet sent by the upstream node, where the packet is a packet generated after the upstream node performs flow processing according to the modified upstream node flow table, and is not a packet of a flow corresponding to a flow entry in the downstream node flow table.

In this embodiment, a first receiving unit is configured to receive flow table support capability information of an upstream node, a first determining unit is configured to determine, according to the flow table support capability information, whether the upstream node supports a downstream node flow table, where the downstream node flow table includes at least one flow entry, and each flow entry corresponds to one flow, and a sending unit is configured to send the downstream node flow table to the upstream node if the upstream node supports the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

Figure 11:
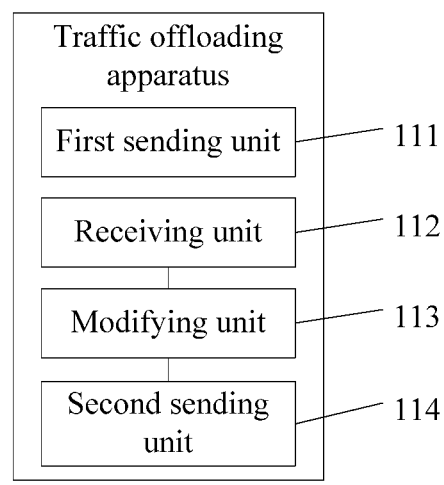
FIG. 11 is a schematic diagram of a structure of still another traffic offloading apparatus according to an embodiment of the present disclosure.

An embodiment provides another traffic offloading apparatus, where the apparatus is a communication peer of the apparatus shown in FIG. 9 or FIG. 10. As shown in FIG. 11, the apparatus may include a first sending unit 111 configured to send flow table support capability information of an upstream node to a downstream node, a receiving unit 112 configured to receive a downstream node flow table sent by the downstream node, where the downstream node flow table includes at least one flow entry, and each flow entry corresponds to one flow, a modifying unit 113 configured to modify an upstream node flow table according to the downstream node flow table, where the modified upstream node flow table includes the downstream node flow table, and a second sending unit 114 configured to send a first packet generated after flow processing is performed according to the modified upstream node flow table to a next downstream node, where the first packet is a packet of a flow corresponding to a flow entry in the downstream node flow table.

In this embodiment, a first sending unit is configured to send flow table support capability information of an upstream node to a downstream node, a receiving unit is configured to receive a downstream node flow table sent by the downstream node, where the downstream node flow table includes at least one flow entry, and each flow entry corresponds to one flow, a modifying unit is configured to modify an upstream node flow table according to the downstream node flow table, where the modified upstream node flow table includes the downstream node flow table, and a second sending unit is configured to send a first packet generated after flow processing is performed according to the modified upstream node flow table to a next downstream node, where the first packet is a packet of a flow corresponding to a flow entry in the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

Figure 12:
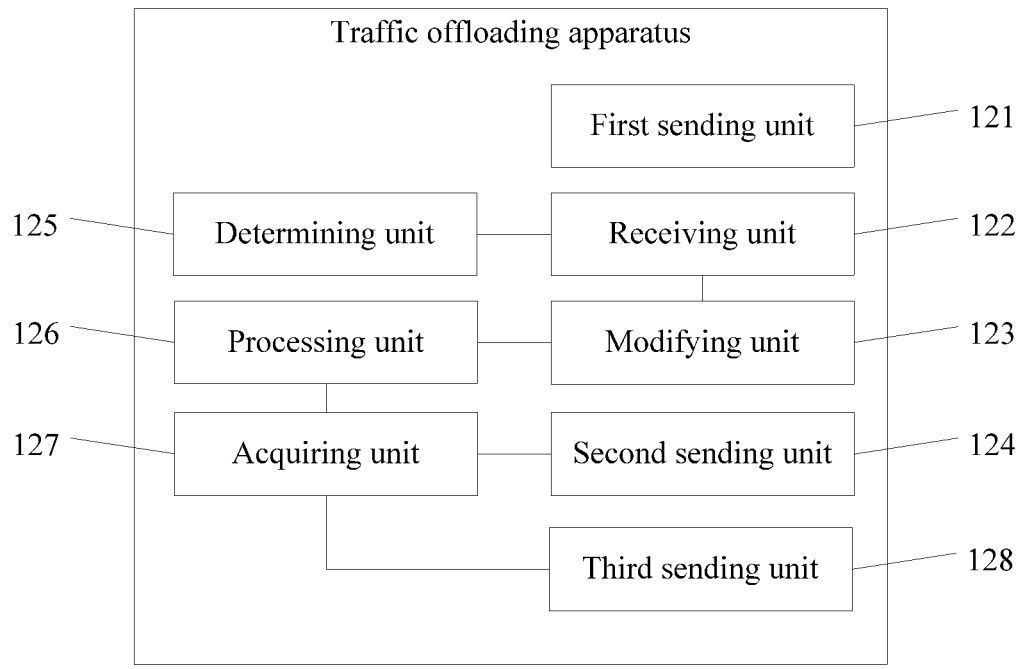
FIG. 12 is a schematic diagram of a structure of yet another traffic offloading apparatus according to an embodiment of the present disclosure.

An embodiment provides yet another traffic offloading apparatus, where the apparatus is a further extension and optimization of the apparatus shown in FIG. 11. As shown in FIG. 12, the apparatus may include a first sending unit 121 configured to send flow table support capability information of an upstream node to a downstream node, a receiving unit 122 configured to receive a downstream node flow table sent by the downstream node, where the downstream node flow table includes at least one flow entry, and each flow entry corresponds to one flow, a modifying unit 123 configured to modify an upstream node flow table according to the downstream node flow table, where the modified upstream node flow table includes the downstream node flow table, and a second sending unit 124 configured to send a first packet generated after flow processing is performed according to the modified upstream node flow table to a next downstream node, where the first packet is a packet of a flow corresponding to a flow entry in the downstream node flow table.

The first sending unit 121 is further configured to send the flow table support capability information to the downstream node directly, or send the flow table support capability information to the downstream node through a management device.

Further, the flow entry includes a correspondence between a flow classification field and an action, and the modifying unit 123 is further configured to determine whether the upstream node flow table includes a specified flow entry, where the specified flow entry is a flow entry whose flow classification field is the same as the flow classification field in the flow entry in the downstream node flow table, and add the action in the flow entry that has the same flow classification field as the specified flow entry and is in the downstream node flow table, to the corresponding specified flow entry if the upstream node flow table includes the specified flow entry, or the modifying unit 123 is further configured to determine whether the upstream node flow table includes a specified flow entry, where the specified flow entry is a flow entry whose flow classification field is the same as the flow classification field in the flow entry in the downstream node flow table, and create a new flow entry in the upstream node flow table according to the downstream node flow table if the upstream node flow table does not include the specified flow entry.

The traffic offloading apparatus further includes a determining unit 125 configured to determine, before the receiving unit receives the downstream node flow table sent by the downstream node, whether modification of the upstream node flow table is currently allowed, where the first sending unit 121 is further configured to receive the downstream node flow table sent by the downstream node, if the determining unit determines that modification of the upstream node flow table is currently allowed.

The determining unit 125 is further configured to determine whether a vacant position currently exists in the upstream node flow table, or determine whether the upstream node is currently allowed to perform traffic offloading on the downstream node.

The apparatus further includes a processing unit 126 configured to perform flow processing on received packets according to the modified upstream node flow table after the modifying unit modifies the upstream node flow table according to the downstream node flow table, where the second sending unit 124 is further configured to acquire the first packet from the packets generated after flow processing is performed, and send the first packet to the next downstream node.

The apparatus further includes an acquiring unit 127 configured to acquire, after flow processing is performed on the received packets according to the modified upstream node flow table, a second packet from the packets generated after flow processing is performed, where the second packet is a packet generated after flow processing is performed according to the modified upstream node flow table, and is not a packet of a flow corresponding to a flow entry in the downstream node flow table, and a third sending unit 128 configured to send the second packet to the downstream node.

In this embodiment, a first sending unit is configured to send flow table support capability information of an upstream node to a downstream node, a receiving unit is configured to receive a downstream node flow table sent by the downstream node, where the downstream node flow table includes at least one flow entry, and each flow entry corresponds to one flow, a modifying unit is configured to modify an upstream node flow table according to the downstream node flow table, where the modified upstream node flow table includes the downstream node flow table, and a second sending unit is configured to send a first packet generated after flow processing is performed according to the modified upstream node flow table to a next downstream node, where the first packet is a packet of a flow corresponding to a flow entry in the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

The following provides some physical apparatus embodiments. The physical apparatus embodiments may correspond to the corresponding method embodiments and apparatus embodiments provided above.

Figure 13:
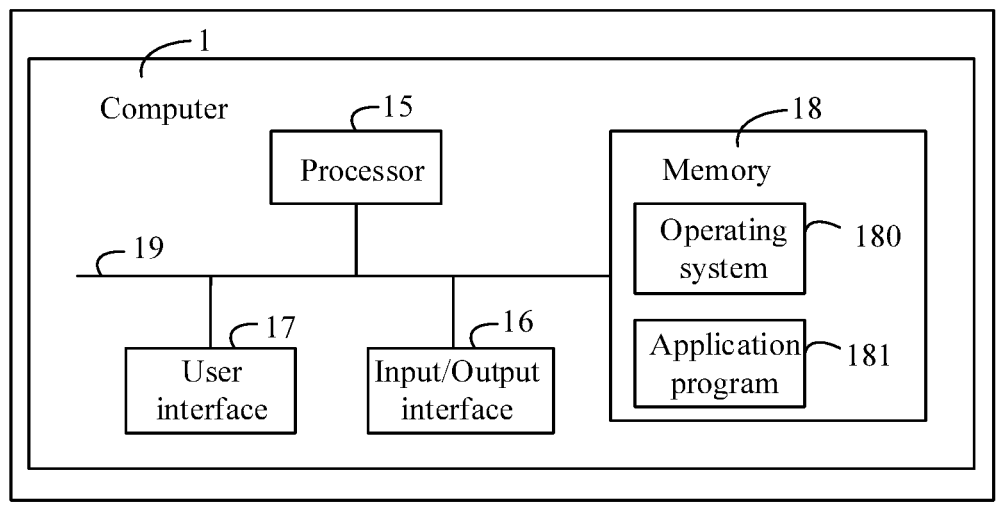
FIG. 13 is a schematic diagram of a structure of a physical traffic offloading apparatus according to an embodiment of the present disclosure.

An embodiment further provides a computer 1. As shown in FIG. 13, the computer 1 includes at least one processor 15, for example, a central processing unit (CPU), at least one input/output interface 16 or a user interface 17, a memory 18, and at least one communications bus 19. The communications bus 19 is configured to implement connection and communication between the foregoing components. The computer 1 optionally includes the user interface 17, including a display, a keyboard, or a pointing device (for example, a mouse, a trackball, a touch pad, or a touch display screen). The memory 18 may include a high-speed random access memory (RAM), or may further include a non-volatile memory, for example, at least one disk memory. The memory 18 may optionally include at least one storage apparatus far away from the processor 15.

In some implementation manners, the memory 18 stores the following elements, an executable module or a data structure, or a subset thereof, or an extended set thereof, an operating system 180, including various system programs configured to implement various basic services and process hardware-based tasks, and an application program 181, including various application programs, and configured to implement various application services.

The application program 181 may be applied to an upstream node and a downstream node, and if the application program 181 is applied to the downstream node, the application program 181 may include but is not limited to a first receiving unit configured to receive flow table support capability information of an upstream node, a first determining unit configured to determine, according to the flow table support capability information, whether the upstream node supports a downstream node flow table, where the downstream node flow table includes at least one flow entry, and each flow entry corresponds to one flow, and a sending unit configured to send the downstream node flow table to the upstream node if the upstream node supports the downstream node flow table.

The first receiving unit is further configured to receive the flow table support capability information that is directly sent by the upstream node, or receive the flow table support capability information that is sent by the upstream node through a management device.

Further, the flow entry includes a correspondence between a flow classification field and an action, and the first determining unit is further configured to determine, according to the flow table support capability information, whether the upstream node supports generation of a flow entry according to the flow classification field, and determine, according to the flow table support capability information, whether the upstream node supports the action.

The application program 181 may further include a second determining unit configured to determine, before the downstream node flow table is sent to the upstream node, whether the upstream node currently allows modification of an upstream node flow table, where the sending unit is further configured to send the downstream node flow table to the upstream node if the upstream node currently allows modification of the upstream node flow table.

The application program 181 may further include a second receiving unit configured to receive a packet sent by the upstream node, where the packet is a packet generated after the upstream node performs flow processing according to the modified upstream node flow table, and is not a packet of a flow corresponding to a flow entry in the downstream node flow table.

If the application program 181 is applied to the upstream node, the application program 181 may include but is not limited to a first sending unit configured to send flow table support capability information of an upstream node to a downstream node, a receiving unit configured to receive a downstream node flow table sent by the downstream node, where the downstream node flow table includes at least one flow entry, and each flow entry corresponds to one flow, a modifying unit configured to modify an upstream node flow table according to the downstream node flow table, where the modified upstream node flow table includes the downstream node flow table, and a second sending unit configured to send a first packet generated after flow processing is performed according to the modified upstream node flow table to a next downstream node, where the first packet is a packet of a flow corresponding to a flow entry in the downstream node flow table.

The first sending unit is further configured to send the flow table support capability information to the downstream node directly, or send the flow table support capability information to the downstream node through a management device.

Further, the flow entry includes a correspondence between a flow classification field and an action, and the modifying unit is further configured to determine whether the upstream node flow table includes a specified flow entry, where the specified flow entry is a flow entry whose flow classification field is the same as the flow classification field in the flow entry in the downstream node flow table, and add the action in the flow entry that has the same flow classification field as the specified flow entry and is in the downstream node flow table, to the corresponding specified flow entry if the upstream node flow table includes the specified flow entry, or the modifying unit is further configured to determine whether the upstream node flow table includes a specified flow entry, where the specified flow entry is a flow entry whose flow classification field is the same as the flow classification field in the flow entry in the downstream node flow table, and create a new flow entry in the upstream node flow table according to the downstream node flow table if the upstream node flow table does not include the specified flow entry.

Further, the application program 181 may further include a determining unit configured to determine, before the receiving unit receives the downstream node flow table sent by the downstream node, whether modification of the upstream node flow table is currently allowed, where the first sending unit is further configured to receive the downstream node flow table sent by the downstream node, if the determining unit determines that modification of the upstream node flow table is currently allowed.

The determining unit is further configured to determine whether a vacant position currently exists in the upstream node flow table, or determine whether the upstream node is currently allowed to perform traffic offloading on the downstream node.

The application program 181 may further include a processing unit configured to perform flow processing on received packets according to the modified upstream node flow table after the modifying unit modifies the upstream node flow table according to the downstream node flow table, where the second sending unit is further configured to acquire the first packet from the packets generated after flow processing is performed, and send the first packet to the next downstream node.

The application program 181 may further include an acquiring unit configured to acquire, after flow processing is performed on the received packets according to the modified upstream node flow table, a second packet from the packets generated after flow processing is performed, where the second packet is a packet generated after flow processing is performed according to the modified upstream node flow table, and is not a packet of a flow corresponding to a flow entry in the downstream node flow table, and a third sending unit configured to send the second packet to the downstream node.

In the embodiment of the present disclosure, when the computer 1 is a downstream node, by invoking a program or an instruction stored in the memory 18, the processor 15 is configured to receive flow table support capability information of an upstream node, determine, according to the flow table support capability information, whether the upstream node supports a downstream node flow table, where the downstream node flow table includes at least one flow entry, and each flow entry corresponds to one flow, and send the downstream node flow table to the upstream node if the upstream node supports the downstream node flow table.

The processor 15 is further configured to receive the flow table support capability information that is directly sent by the upstream node, or receive the flow table support capability information that is sent by the upstream node through a management device.

Further, the flow entry includes a correspondence between a flow classification field and an action, and the processor 15 is further configured to determine, according to the flow table support capability information, whether the upstream node supports generation of a flow entry according to the flow classification field, and determine, according to the flow table support capability information, whether the upstream node supports the action.

The processor 15 is further configured to determine, before the downstream node flow table is sent to the upstream node, whether the upstream node currently allows modification of an upstream node flow table. The processor 15 is further configured to send the downstream node flow table to the upstream node if the upstream node currently allows modification of the upstream node flow table.

The processor 15 is further configured to receive a packet sent by the upstream node, where the packet is a packet generated after the upstream node performs flow processing according to the modified upstream node flow table, and is not a packet of a flow corresponding to a flow entry in the downstream node flow table.

In the embodiment of the present disclosure, when the computer 1 is an upstream node, by invoking a program or an instruction stored in the memory 18, the processor 15 is configured to send flow table support capability information of the upstream node to a downstream node, receive a downstream node flow table sent by the downstream node, where the downstream node flow table includes at least one flow entry, and each flow entry corresponds to one flow, modify an upstream node flow table according to the downstream node flow table, where the modified upstream node flow table includes the downstream node flow table, and send a first packet generated after flow processing is performed according to the modified upstream node flow table to a next downstream node, where the first packet is a packet of a flow corresponding to a flow entry in the downstream node flow table.

The processor 15 is further configured to send the flow table support capability information to the downstream node directly, or send the flow table support capability information to the downstream node through a management device.

Further, the flow entry includes a correspondence between a flow classification field and an action, and the processor 15 is further configured to determine whether the upstream node flow table includes a specified flow entry, where the specified flow entry is a flow entry whose flow classification field is the same as the flow classification field in the flow entry in the downstream node flow table, and add the action in the flow entry that has the same flow classification field as the specified flow entry and is in the downstream node flow table, to the corresponding specified flow entry if the upstream node flow table includes the specified flow entry, or determine whether the upstream node flow table includes a specified flow entry, where the specified flow entry is a flow entry whose flow classification field is the same as the flow classification field in the flow entry in the downstream node flow table, and create a new flow entry in the upstream node flow table according to the downstream node flow table if the upstream node flow table does not include the specified flow entry.

Further, the processor 15 is configured to determine, before receiving the downstream node flow table sent by the downstream node, whether modification of the upstream node flow table is currently allowed, and the processor 15 is further configured to receive the downstream node flow table sent by the downstream node, if modification of the upstream node flow table is currently allowed.

The processor 15 is further configured to determine whether a vacant position currently exists in the upstream node flow table, or determine whether the upstream node is currently allowed to perform traffic offloading on the downstream node.

Further, the processor 15 is configured to perform flow processing on received packets according to the modified upstream node flow table after the upstream node flow table is modified according to the downstream node flow table, and the processor 15 is further configured to acquire the first packet from the packets generated after flow processing is performed, and send the first packet to the next downstream node.

The processor 15 is further configured to acquire, after flow processing is performed on the received packets according to the modified upstream node flow table, a second packet from the packets generated after flow processing is performed, where the second packet is a packet generated after flow processing is performed according to the modified upstream node flow table, and is not a packet of a flow corresponding to a flow entry in the downstream node flow table, and send the second packet to the downstream node.

In this embodiment, a downstream node receives flow table support capability information of an upstream node, determines, according to the flow table support capability information, whether the upstream node supports a downstream node flow table, where the downstream node flow table includes at least one flow entry, and each flow entry corresponds to one flow, and sends the downstream node flow table to the upstream node such that the upstream node modifies an upstream node flow table according to the downstream node flow table if the upstream node supports the downstream node flow table, where the modified upstream node flow table includes the downstream node flow table. After the upstream node flow table is modified, the upstream node sends a first packet generated after flow processing is performed according to the modified upstream node flow table to a next downstream node, where the first packet is a packet of a flow corresponding to a flow entry in the downstream node flow table. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes, which further lowers performance specification requirements on the downstream node.

In addition, the upstream node may be a flow distribution node and a service processing node, and the downstream node may be a service processing node. Therefore, implementation of traffic offloading is not limited only to the flow distribution node and the service processing node, and is further extended to adjacent service nodes.

The following provides some system embodiments, where the system embodiments correspond to the methods, apparatuses, and physical apparatuses provided above.

Figure 14:
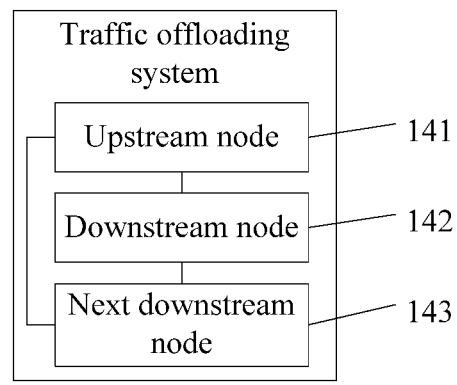
FIG. 14 is a schematic diagram of a structure of a traffic offloading system according to an embodiment of the present disclosure.

An embodiment provides a traffic offloading system, as shown in FIG. 14, where the system may include an upstream node 141 configured to send flow table support capability information of the upstream node 141 to a downstream node 142, after the upstream node 141 determines, according to the flow table support capability information, that the upstream node 141 supports a flow table of the downstream node 142, receive the flow table of the downstream node 142 sent by the downstream node 142, where the flow table of the downstream node 142 includes at least one flow entry, and each flow entry corresponds to one flow, modify a flow table of the upstream node 141 according to the flow table of the downstream node 142, where the modified flow table of the upstream node 141 includes the flow table of the downstream node 142, and send a first packet generated after flow processing is performed according to the modified flow table of the upstream node 141 to a next downstream node 143, where the first packet is a packet of a flow corresponding to a flow entry in the flow table of the downstream node 142. The downstream node 142 is configured to receive the flow table support capability information, determine, according to the flow table support capability information, whether the upstream node 141 supports the flow table of the downstream node 142, and if the upstream node 141 supports the flow table of the downstream node 142, send the flow table of the downstream node 142 to the upstream node 141, and the next downstream node 143 is configured to receive the first packet sent by the upstream node 141.

In this embodiment, an upstream node is configured to send flow table support capability information of the upstream node to a downstream node, after the downstream node determines, according to the flow table support capability information, that the upstream node supports a downstream node flow table, receive the downstream node flow table sent by the downstream node, where the downstream node flow table includes at least one flow entry, and each flow entry corresponds to one flow, modify an upstream node flow table according to the downstream node flow table, where the modified upstream node flow table includes the downstream node flow table, and send a first packet generated after flow processing is performed according to the modified upstream node flow table to a next downstream node, where the first packet is a packet of a flow corresponding to a flow entry in the downstream node flow table. The downstream node is configured to receive the flow table support capability information, determine, according to the flow table support capability information, whether the upstream node supports the downstream node flow table, and if the upstream node supports the downstream node flow table, send the downstream node flow table to the upstream node. The next downstream node is configured to receive the first packet sent by the upstream node. After the foregoing solution is used, as long as the downstream node determines that the upstream node supports the downstream node flow table, the upstream node modifies the upstream node flow table according to the downstream node flow table, and the modified upstream node flow table includes the downstream node flow table, traffic offloading can be implemented on the downstream node. Therefore, traffic offloading can be implemented on a downstream node of any adjacent upstream and downstream nodes.

Figure 15:
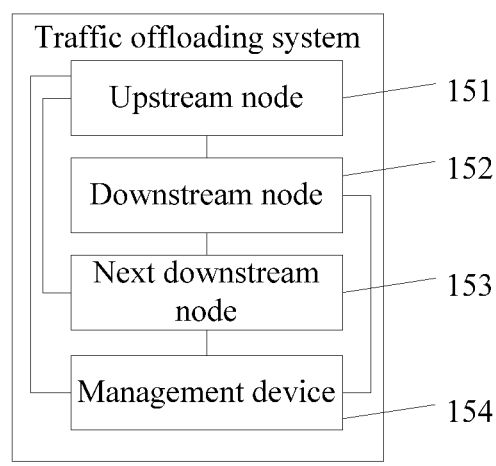
FIG. 15 is a schematic diagram of a structure of another traffic offloading system according to an embodiment of the present disclosure.

An embodiment provides another traffic offloading system, where the system is a further extension and optimization of the system shown in FIG. 14. As shown in FIG. 15, the system may include an upstream node 151 configured to send flow table support capability information of the upstream node 151 to a downstream node 152, receive the flow table of the downstream node 152 sent by the downstream node 152 after the downstream node 152 determines, according to the flow table support capability information, that the upstream node 151 supports a flow table of the downstream node 152, where the flow table of the downstream node 152 includes at least one flow entry, and each flow entry corresponds to one flow, modify a flow table of the upstream node 151 according to the flow table of the downstream node 152, where the modified flow table of the upstream node 151 includes the flow table of the downstream node 152, and send a first packet generated after flow processing is performed according to the modified flow table of the upstream node 151 to a next downstream node 153, where the first packet is a packet of a flow corresponding to a flow entry in the flow table of the downstream node 152. The downstream node 152 is configured to receive the flow table support capability information, determine, according to the flow table support capability information, whether the upstream node 151 supports the flow table of the downstream node 152, and if the upstream node 151 supports the flow table of the downstream node 152, send the flow table of the downstream node 152 to the upstream node 151, and the next downstream node 153 is configured to receive the first packet sent by the upstream node 151.

The upstream node 151 is further configured to send the flow table support capability information to the downstream node 152 directly, and the downstream node 152 is further configured to receive the flow table support capability information sent by the upstream node 151.

The system further includes a management device 154, where the upstream node 151 is further configured to send the flow table support capability information to the management device 154. The management device 154 is configured to receive the flow table support capability information sent by the upstream node 151, and send the flow table support capability information to the downstream node 152, and the downstream node 152 is further configured to receive the flow table support capability information sent by the management device 154.

Further, the flow entry includes a correspondence between a flow classification field and an action, and the downstream node 152 is further configured to determine, according to the flow table support capability information, whether the upstream node 151 supports generation of a flow entry according to the flow classification field, and determine, according to the flow table support capability information, whether the upstream node 151 supports the action.

The upstream node 151 is further configured to determine, before receiving the flow table of the downstream node 152 sent by the downstream node 152, whether modification of the flow table of the upstream node 151 is currently allowed, and receive the flow table of the downstream node 152 sent by the downstream node 152 if modification of the flow table of the upstream node 151 is currently allowed, and the downstream node 152 is further configured to determine, before sending the flow table of the downstream node 152 to the upstream node 151, whether the upstream node 151 currently allows modification of the flow table of the upstream node 151, and send the flow table of the downstream node 152 to the upstream node 151 if the upstream node 151 currently allows modification of the flow table of the upstream node 151.

Further, the flow entry includes the correspondence between the flow classification field and the action, and the upstream node 151 is further configured to determine whether the flow table of the upstream node 151 includes a specified flow entry, where the specified flow entry is a flow entry whose flow classification field is the same as the flow classification field in the flow entry in the flow table of the downstream node 152, and add the action in the flow entry that has the same flow classification field as the specified flow entry and is in the flow table of the downstream node 152, to the corresponding specified flow entry if the flow table of the upstream node 151 includes the specified flow entry, or the upstream node 151 is further configured to determine whether the flow table of the upstream node 151 includes a specified flow entry, where the specified flow entry is a flow entry whose flow classification field is the same as the flow classification field in the flow entry in the flow table of the downstream node 152, and create a new flow entry in the flow table of the upstream node 151 according to the flow table of the downstream node 152 if the flow table of the upstream node 151 does not include the specified flow entry.

The upstream node 151 is further configured to determine whether a vacant position currently exists in the flow table of the upstream node 151, or determine whether the upstream node 151 is currently allowed to perform traffic offloading on the downstream node 152.

The upstream node 151 is further configured to perform flow processing on received packets according to the modified flow table of the upstream node 151 after modifying the flow table of the upstream node 151 according to the flow table of the downstream node 152, acquire the first packet from the packets generated after flow processing is performed, and send the first packet to the next downstream node 153.

The upstream node 151 is further configured to acquire a second packet from the packets generated after flow processing is performed after performing flow processing on the received packets according to the modified flow table of the upstream node 151, and send the second packet to the downstream node 152, where the second packet is a packet generated after flow processing is performed according to the modified flow table of the upstream node 151, and is not a packet of a flow corresponding to a flow entry in the flow table of the downstream node 152, and the downstream node 152 is further configured to receive the second packet sent by the upstream node 151.

In this embodiment, an upstream node is configured to send flow table support capability information of the upstream node to a downstream node, receive the downstream node flow table sent by the downstream node after the downstream node determines, according to the flow table support capability information, that the upstream node supports a downstream node flow table, where the downstream node flow table includes at least one flow entry, and each flow entry corresponds to one flow, modify an upstream node flow table according to the downstream node flow table, where the modified upstream node flow table includes the downstream node flow table, and send a first packet generated after flow processing is performed according to the modified upstream node flow table to a next downstream node, where the first packet is a packet of a flow corresponding to a flow entry in the downstream node flow table. The downstream node is configured to receive the flow table support capability information, determine, according to the flow table support capability information, whether the upstream node supports the downstream node flow table, and send the downstream node flow table to the upstream node if the upstream node supports the downstream node flow table. The next downstream node is configured to receive the first packet sent by the upstream node.

Based on the foregoing descriptions of the implementation manners, a person skilled in the art may clearly understand that the present disclosure may be implemented by software in addition to necessary universal hardware or by hardware only. In most circumstances, the former is a preferred implementation manner. Based on such an understanding, the technical solutions of the present disclosure essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A traffic offloading method, comprising:
    receiving, by a downstream node, flow table support capability information of an upstream node;
    determining, according to the flow table support capability information, whether the upstream node supports a downstream node flow table, wherein the downstream node flow table comprises at least one flow entry, and wherein each flow entry corresponds to one flow; and
    sending the downstream node flow table to the upstream node when the upstream node supports the downstream node flow table.

2. The traffic offloading method according to claim 1, wherein the flow entry comprises a correspondence between a flow classification field and an action, and wherein determining, according to the flow table support capability information, whether the upstream node supports the downstream node flow table, comprises:
    determining, according to the flow table support capability information, whether the upstream node supports generation of the flow entry according to the flow classification field; and
    determining, according to the flow table support capability information, whether the upstream node supports the action.

3. The traffic offloading method according to claim 1, wherein before sending the downstream node flow table to the upstream node, the method further comprises determining whether the upstream node currently allows modification of an upstream node flow table, and wherein sending the downstream node flow table to the upstream node comprises sending the downstream node flow table to the upstream node when the upstream node currently allows modification of the upstream node flow table.

4. The traffic offloading method according to claim 3, further comprising receiving a first packet sent by the upstream node, wherein the first packet is a packet generated after the upstream node performs flow processing according to the modified upstream node flow table, and wherein the first packet is not a packet of the flow corresponding to the flow entry in the downstream node flow table.

5. A traffic offloading method, comprising:
    sending, by an upstream node, flow table support capability information of the upstream node to a downstream node;
    receiving a downstream node flow table sent by the downstream node, wherein the downstream node flow table comprises at least one flow entry, and wherein each flow entry corresponds to one flow;
    modifying an upstream node flow table according to the downstream node flow table, wherein the modified upstream node flow table comprises the downstream node flow table; and
    sending a first packet generated after flow processing is performed according to the modified upstream node flow table to a next downstream node, wherein the first packet is a packet of the flow corresponding to the flow entry in the downstream node flow table.

6. The traffic offloading method according to claim 5, wherein the flow entry comprises a correspondence between a flow classification field and an action, and wherein modifying the upstream node flow table according to the downstream node flow table comprises:
    determining whether the upstream node flow table comprises a specified flow entry, wherein the specified flow entry is a flow entry whose flow classification field is same as the flow classification field in the flow entry in the downstream node flow table;
    adding the action in the flow entry that has the same flow classification field as the specified flow entry and is in the downstream node flow table, to the corresponding specified flow entry when the upstream node flow table comprises the specified flow entry; and
    creating a new flow entry in the upstream node flow table according to the downstream node flow table when the upstream node flow table does not comprise the specified flow entry.

7. The traffic offloading method according to claim 5, wherein before receiving the downstream node flow table sent by the downstream node, the method further comprises determining whether the modification of the upstream node flow table is currently allowed, and wherein receiving the downstream node flow table sent by the downstream node comprises receiving the downstream node flow table sent by the downstream node when the modification of the upstream node flow table is currently allowed.

8. The traffic offloading method according to claim 7, wherein determining whether the modification of the upstream node flow table is currently allowed comprises one of:
    determining whether a vacant position currently exists in the upstream node flow table; and
    determining whether the upstream node is currently allowed to perform traffic offloading on the downstream node.

9. The traffic offloading method according to claim 5, wherein after modifying the upstream node flow table according to the downstream node flow table, the method further comprises performing flow processing on received packets according to the modified upstream node flow table, and wherein sending the first packet generated after flow processing is performed according to the modified upstream node flow table to the next downstream node comprises:
    acquiring the first packet from the packets generated after flow processing is performed; and
    sending the first packet to the next downstream node.

10. The traffic offloading method according to claim 9, wherein after performing flow processing on the received packets according to the modified upstream node flow table, the method further comprises:
    acquiring a second packet from the packets generated after flow processing is performed, wherein the second packet is the packet generated after flow processing is performed according to the modified upstream node flow table, and wherein the second packet is not the packet of the flow corresponding to the flow entry in the downstream node flow table; and sending the second packet to the downstream node.

11. A traffic offloading apparatus, comprising:
a receiver;
a processor; and
a transmitter,
wherein the receiver, the processor, and the transmitter are coupled to each other, wherein the receiver is configured to receive flow table support capability information of an upstream node,
wherein the processor is configured to determine, according to the flow table support capability information, whether the upstream node supports a downstream node flow table, wherein the downstream node flow table comprises at least one flow entry, wherein each flow entry corresponds to one flow, and
wherein the transmitter is configured to send the downstream node flow table to the upstream node when the upstream node supports the downstream node flow table.

12. The traffic offloading apparatus according to claim 11, wherein the flow entry comprises a correspondence between a flow classification field and an action, and wherein the processor is further configured to:
determine, according to the flow table support capability information, whether the upstream node supports generation of the flow entry according to the flow classification field; and
determine, according to the flow table support capability information, whether the upstream node supports the action.

13. The traffic offloading apparatus according to claim 12, wherein the processor is further configured to determine, before the downstream node flow table is sent to the upstream node, whether the upstream node currently allows modification of an upstream node flow table, and wherein the transmitter is further configured to send the downstream node flow table to the upstream node when the upstream node currently allows modification of the upstream node flow table.

14. The traffic offloading apparatus according to claim 13, wherein the receiver is further configured to receive a first packet sent by the upstream node, wherein the first packet is a packet generated after the upstream node performs flow processing according to the modified upstream node flow table, and wherein the first packet is not a packet of the flow corresponding to the flow entry in the downstream node flow table.

15. A traffic offloading apparatus, comprising:
a memory; and
a processor coupled to the memory and configured to:
send flow table support capability information of an upstream node to a downstream node;
receive a downstream node flow table sent by the downstream node, wherein the downstream node flow table comprises at least one flow entry, and wherein each flow entry corresponds to one flow;
modify an upstream node flow table according to the downstream node flow table, wherein the modified upstream node flow table comprises the downstream node flow table; and
send a first packet generated after flow processing is performed according to the modified upstream node flow table to a next downstream node, wherein the first packet is a packet of the flow corresponding to the flow entry in the downstream node flow table.

16. The traffic offloading apparatus according to claim 15, wherein the flow entry comprises a correspondence between a flow classification field and an action, and wherein the processor is further configured to:
determine whether the upstream node flow table comprises a specified flow entry, wherein the specified flow entry is a flow entry whose flow classification field is same as the flow classification field in the flow entry in the downstream node flow table;
add the action in the flow entry that has the same flow classification field as the specified flow entry and is in the downstream node flow table, to the corresponding specified flow entry when the upstream node flow table comprises the specified flow entry; and
create a new flow entry in the upstream node flow table according to the downstream node flow table when the upstream node flow table does not comprise the specified flow entry.

17. The traffic offloading apparatus according to claim 15, wherein the processor is further configured to:
determine, before receiving the downstream node flow table sent by the downstream node, whether the modification of the upstream node flow table is currently allowed; and
receive the downstream node flow table sent by the downstream node when the modification of the upstream node flow table is currently allowed.

18. The traffic offloading apparatus according to claim 17, wherein the processor is further configured to perform one of:
determine whether a vacant position currently exists in the upstream node flow table; and
determine whether the upstream node is currently allowed to perform traffic offloading on the downstream node.

19. The traffic offloading apparatus according to 15, wherein the processor is further configured to:
perform flow processing on received packets according to the modified upstream node flow table after modifying the upstream node flow table according to the downstream node flow table;
acquire the first packet from the packets generated after flow processing is performed; and
send the first packet to the next downstream node.

20. The traffic offloading apparatus according to claim 19, wherein the processor is further configured to:
acquire, after flow processing is performed on the received packets according to the modified upstream node flow table, a second packet from the packets generated after flow processing is performed, wherein the second packet is a packet generated after flow processing is performed according to the modified upstream node flow table, and wherein the second packet is not the packet of the flow corresponding to the flow entry in the downstream node flow table; and
send the second packet to the downstream node.

* * * * *

UNITED STATES PATENT AND TRADEMARK OFFICE
CERTIFICATE OF CORRECTION

PATENT NO.         : 9,942,155 B2                         Page 1 of 1
APPLICATION NO.    : 15/172715
DATED              : April 10, 2018
INVENTOR(S)        : Jishang Yang It is certified that error appears in the above-identified patent and that said Letters Patent is hereby corrected as shown below:

On the Title Page

Item (56), Line 3, under Other Publications should read:
"SPARC ICT-258457 Split Architecture for Large Scale Wide Area Networks Deliverable D3.3,"
Retrieved from the Internet: URL: http://www.fp7-sparc.eu/assets/deliverables/SPARC_D3.3_Split_Architecture_for_Large_Scale_wide_Area_Networks.pdf [retrieved on Sep. 11, 2014], Dec. 2011, 130 pages.

Signed and Sealed this
Twenty-second Day of May, 2018

Andrei Iancu
*Director of the United States Patent and Trademark Office*